Aug. 10, 1937.  F. E. WOLCOTT  2,089,520
COFFEE OR TEA MAKER
Filed April 23, 1934  2 Sheets-Sheet 1
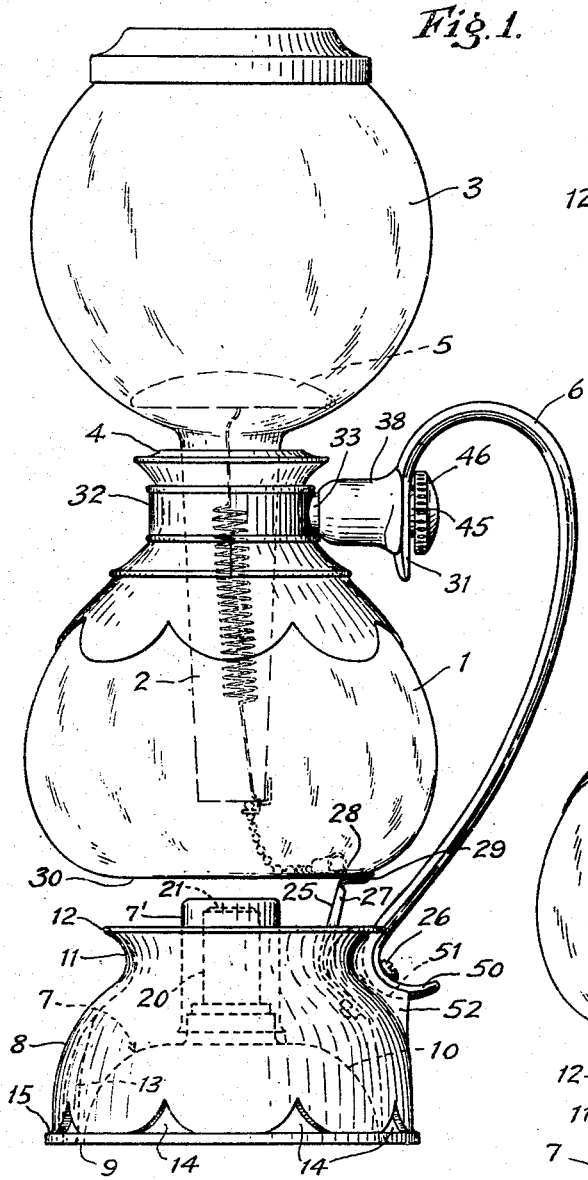
INVENTOR
FRANK E. WOLCOTT
BY
ATTORNEY.

Aug. 10, 1937. F. E. WOLCOTT 2,089,520
COFFEE OR TEA MAKER
Filed April 23, 1934 2 Sheets-Sheet 2

INVENTOR
FRANK E. WOLCOTT
BY
ATTORNEY.

Patented Aug. 10, 1937

2,089,520

UNITED STATES PATENT OFFICE 2,089,520

COFFEE OR TEA MAKER

Frank E. Wolcott, West Hartford, Conn.

Application April 23, 1934, Serial No. 721,951

27 Claims. (Cl. 53—3)

My invention relates to coffee or tea makers.

It has heretofore been proposed to heat coffee or tea with a spirit flame, such for example as alcohol, acting upon the bottom of a glass or other bowl containing the beverage. However, in these constructions, the flame has been of such character as quickly to smudge the bottom of the bowl and thereby not only produce a very unattractive effect, but also cut down the heating efficiency of the flame. Moreover, the flame has been subject to variations, flaring to one side or another, or going out, as a result of air currents, and presenting some elements of danger and annoyance, as when the fingers are burned as a result of a sudden flare or when the bowl support has been unduly heated by the laterally flaring flame. Moreover, in addition to the smudging effect arising from the carbonization of the wick, usually of woven cotton wicking, the wick has been burned away with considerable rapidity and usually with an accompanying odor. As a consequence, although some coffee and tea making devices have continued to be heated by spirit lamps, the above disadvantages, apparently heretofore considered to be inherent in such devices, have resulted, in recent years, in a substantial decrease in the proportion of such spirit heated devices in use.

My invention has for its object to provide an improved coffee or tea making device of the spirit heated type. A further object of the same is to provide such a construction wherein, as a result of my improvements, it is made possible to eliminate the smudging of the bowl and provide a markedly more clear and a better contracted flame than has heretofore been obtainable. A still further object is to eliminate the carbonization of the wick whereby not only is the smudging resulting from carbonization eliminated, but the wick life is substantially lengthened. Other objects of my invention are to provide improved air distributing and flame controlling and baffling means, whereby it is made possible not only to maintain an adequate air supply to the flame, but to control and direct the flame in a new and effective manner making the same materially more constant, effective, and free from danger, while also preventing objectionable heating of the bowl support. These and other objects and advantages will, however, hereinafter more fully appear.

In the accompanying drawings, I have shown for purposes of illustration two embodiments which my invention may assume in practice, illustrating the same as applied to use in connection with a coffee maker and a tea maker.

In these drawings,

Figure 1 is a side elevation of a coffee maker constructed in accordance with my improvements;

Figure 2 is a side elevation of the same with the upper coffee maker bowl removed ready for dispensing, the spirit stove casing and lower and upper portions of the bowl support being shown in section to facilitate illustration, and the spirit lamp being shown in side elevation;

Figure 3 is a top plan view of the lower end of the bowl support, the handle being broken away and the bowl removed to show the lamp casing;

Figure 4 is a bottom plan view of the lamp casing;

Figure 5:
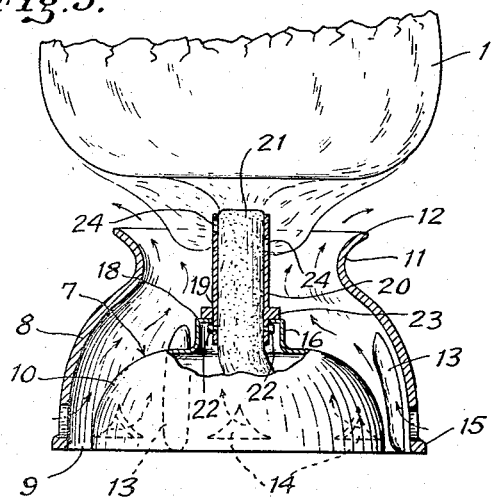
Figure 5 is a detail central vertical sectional view of the lamp and enclosing casing therefor showing the form of the flame acting upon the lower part of the bowl, with the air flow indicated by arrows.
Figure 7:
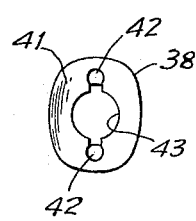
Figure 7 is an enlarged detail view of one of the bowl support connecting members.
Figure 8:
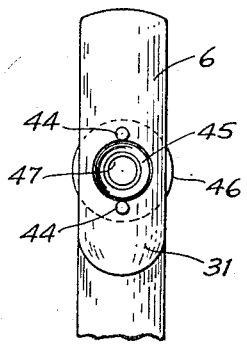
Figure 8 is a like view of the bowl supporting handle member.
Figure 6:
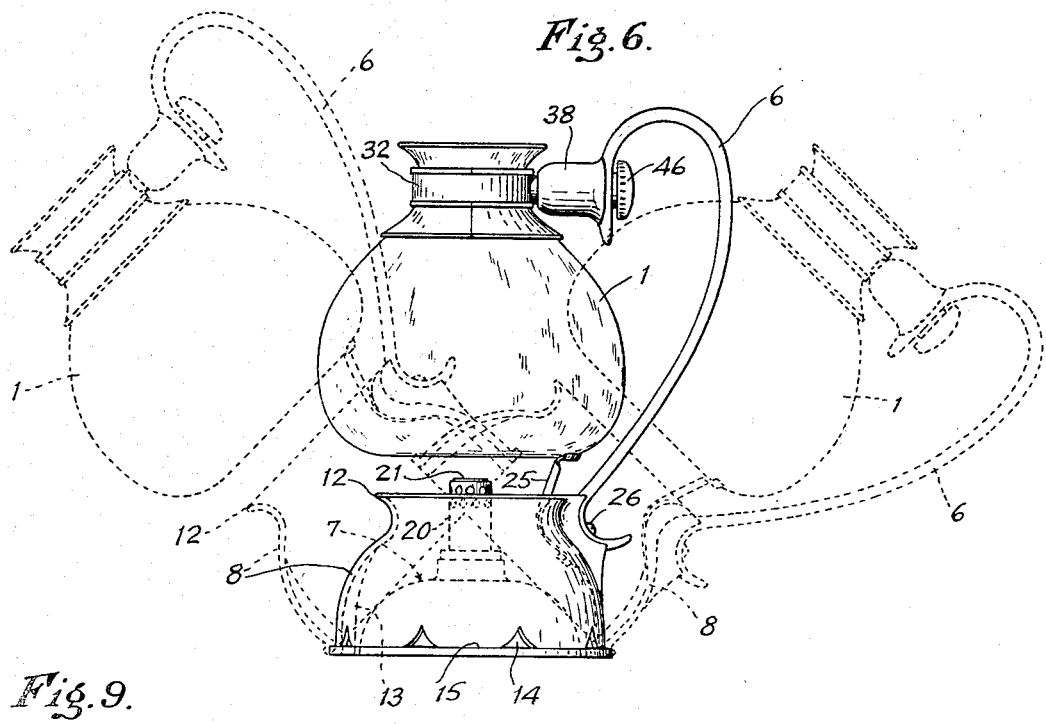
Figure 6 is a side elevation similar to Figure 2 but on a reduced scale, showing the support in different angular positions which may be occupied during placing the same upon or removing it from the lamp which is indicated in dotted lines.
Figure 9:
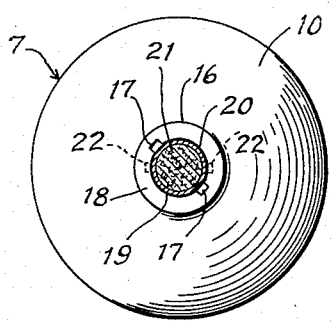
Figure 9 is a transverse sectional view on line 9—9 of Figure 2 showing the means for connecting the vaporizer tube to the lamp body.

Referring first to the form of the construction shown in Figure 1, it will be noted that therein a coffee maker is illustrated, which is of the well known vacuum type including a lower water bowl 1 receiving the stem 2 of an upper coffee bowl 3 through a seal 4 which is, in turn, seated in the neck of the bowl 1, while a usual filter 5 is carried in the bowl 3; the bowl 1 herein being grasped about the exterior of its neck and connected by improved means to a combined bowl support and handle 6, which supports the lower bowl 1 above an improved spirit lamp, generally indicated at 7, and, in turn, disposed in an improved casing 8 on which the bowl support 6 is also carried, all as hereinafter more fully described.

Referring to the casing 8, it will be noted that the same is hollow and provided with an open bottom 9 slightly larger in diameter than the bottom of the body 10 of the lamp. Further, it will be noted that this casing curves inward toward its top to a point below the top of the lamp and then is reversely curved to provide a constricted portion 11 and generally bell-mounted upper end 12 of smaller diameter than the lower end. Herein, the bottom of the casing is also provided with a plurality of radially located, spaced rib members 13 projecting inward from the inner wall thereof and extending upward to a point substantially spaced below the constricted portion 11 where these ribs merge into the inner wall of the casing. Attention is also directed to the radially located air inlets 14 provided in the base of the casing, herein in the form of openings equally spaced around the casing bottom above a narrow bottom laterally extending flange 15 which forms the actual supporting surface for the casing. As shown, eight such openings are herein provided with the ribs 13 equally spaced between the openings of adjacent pairs. Also, the openings are in the form of triangular openings, but it will be evident that other forms of openings may be used if desired. As a result of this construction, it will be evident that a very effective draft is provided through the openings 14 around the circumference of the casing, the air flowing in through the openings and up along the inner walls of the casing between the ribs 13 and outside the flame of the stove 7 in the general path indicated in Figure 5, and in sufficient quantity to produce an effective flame.

Cooperating with the casing 8, is the lamp 7. As shown herein, the bottom of the body 10 of the latter rests directly upon the table or other support on which the supporting flange 15 of the casing is supported. As shown, this body 10 is also of maximum diameter at its bottom and of slightly larger diameter than a circle which would contact with the lower ends of the several ribs 13, while the upper part of the body 10 curves inward and upward away from the portion of the casing below the constricted portion 11. On the top of the body 10, as for example on a shoulder 16, oppositely located apertures 17 are provided in an upper rim 18 which surrounds an axial aperture 19 in which a vaporizer tube 20 is located. Herein, it will be noted that a wick 21, preferably of round felt, of uniform texture, extends from liquid in the body 10 axially up through this tube 20 to a point slightly above the upper end thereof. Also, it will be noted that oppositely extending projections 22 on the lower end of the tube 20 are provided which are adapted to pass through the apertures 17 and upon rotation beneath the rim 18, hold the tube and wick down upon the rim 18. As shown, an overlying flange 23 is preferably also provided on the tube 20 above the projections 22 and sufficiently spaced therefrom to permit rotation of the tube into and out of holding position with the rim 18 disposed between this rim 23 and the projections 22. Herein, also, it will be noted that the vaporizer tube extends above the rim 23 to a point slightly above the top of the mouth 12 of the casing 8, and closely adjacent the bottom of the bowl 1. As shown, a plurality of lateral gas escape apertures 24 is also provided adjacent the upper extremity of this tube, these apertures herein being round and disposed in two series of holes, one above the other and in staggered relation, although obviously the number and arrangement may be varied.

As a result of this construction, not only is the wick properly held down to insure the desired location relative to the bottom of the bowl, but a wholly new and very effective vaporizing action is obtained through the apertures 24. More particularly, when the felt wick is ignited, the flame, heating the portion thereof below the top and vaporizing the liquid in the wick inside the apertures 24, quite quickly moves down from the projecting end of the wick as it ignites this gas which issues in jets through the apertures 24. Thereafter, the flame is formed by these burning gas jets with practically no carbonization of the protruding end of the wick, the latter apparently being in a relatively cool central zone surrounded by a wall of flame passing up to the bottom of the bowl 1 and spreading over the same. Moreover, it will be noted that the flame is fed from the air supply previously described as entering through the openings 14 while also being prevented thereby from unduly heating the inner wall of the casing 8, the latter, in effect, forming a chimney with an annular stream of air between its upper end and the flame.

Cooperating with the structure heretofore described, and further acting to control the flame is also a baffle member 25. Herein, this baffle is suitably connected at its lower end as by a bolt 26 to the casing 8, and extends up through the constricted portion 11 of the casing in triangular upwardly extending form between the flame and the lower end of the bowl support 6. Moreover, it will be noted that the baffle 25 contacts at its bottom with the casing 8 and is spaced from the latter, after the manner of a chord, toward the top, while being provided with vertically extending edge flanges 27 contacting with the constricted portion and just above the same. Thus, it will be observed that any tendency for the flame to heat the lower end of the bowl support 6 is overcome not only by the upward flow of air from the apertures 14 along the inner surface of the baffle 25, but also by the baffle, which is in turn spaced by air insulation from the constricted portion 11 of the casing, while any flame tending to pass laterally toward the support 6 above the bell-mouth 12 is prevented by the baffle from heating the lower end of the support 6.

Herein, the baffle 25 also cooperates with the support 6 in supporting the bowl 1, the baffle engaging the bottom of the bowl, while the support 6 is connected about the neck thereof. Herein, the baffle 25 is provided with a laterally extended arcuate supporting portion 28 surrounded by an upstanding curved rim portion 29, and is so disposed relative to the bowl bottom that a portion of the edge of the round flat bottom 30 of the bowl 1 rests on the portion 28 with the upstanding flange 29 engaging the curved portion of the bowl leading up from the flat bottom 30 thereon. Thus it will be observed that while the bowl support and baffle are of a quick cooling structure minimizing heat storage and resultant delay in the return of the brewed coffee to the lower bowl 1, the bowls 1 and 3 with water and coffee therein, are securely supported by the baffle and support 6. Further, it will be particularly noted that any downward pressure on the bowl 1, such as would occur when the seal 4 or the stem of the bowl 3 is seated in the neck of the bowl 1, is prevented from springing the support 6 in such manner as to cant the bowl 1 relative to the lamp 7, and thereby interfere with the desired even distribution of the flame while, of course, also detracting from the appearance of the coffee maker. This bowl support 28 also acts as a locating element for the bowl 1 when connecting the latter to the support 6 by improved connecting means hereafter described.

In my improved construction, improved connecting means are provided between the bowl 1 and support 6 which make it possible for the bowl 1 to be readily disconnected laterally from the support 6 whenever desired, as for cleansing, while the support 6 remains connected to the casing 8. Herein, these connecting means are in the form of a laterally separable connection between an upper depending end 31 on the support 6 and a band 32 of well known form grasping the neck of the bowl 1. As illustrated, they include a connecting member 33 which herein has a cross pin 34 received in slots 34' in the tops of adjacent laterally extending ends 32' on the band 32, and also has a tapered portion 35 leading to a threaded extremity 36 of smaller diameter, while this threaded extremity is also axially threaded as at 37. Enclosing this member 33 and slidable longitudinally thereon is a cooperating slidable connecting member 38 having oppositely disposed slots 39 therein which receive the projecting upper and lower edges 40 of the lateral extensions 32' on the band and act to secure the connecting member 33 in position thereon while inhibiting rotation of the member 38. Herein also, it will be noted that the outer end of this slidable member 38 is dished as at 41 to conform to and receive the adjacent surface of the portion 31, and provided with oppositely located apertures 42 above and below that end of a bore 43 in which the member 33 is received and which is substantially larger than either the tapered portion 35 or the threaded extremity 36 on the member 33 which are disposed in the open end of this bore. Moreover, it will be noted that projecting dowels or pins 44 on the portion 31 of the support 6 are receivable in the apertures 42 and that the portion 31 also has rotatably mounted therein, a rotatable releasing or connecting member 45 having a knurled enlarged turning portion 46 on its outer end and its inner end extending through the portion 31 and turned over as by peening or the like on the inner surface of the portion 31 while being provided with internal threads 47 receiving the threaded portion 36.

With this construction, it will be evident that when the bowl 1 is supported on the support 28 and the threaded extension 36 is brought into registry with the threads 47 inside the member 45, the adjacent surface of the portion 31 will fit into the dished surface 41 and the projections 44 will be received in the apertures 42 in such manner as to prevent relative rotation between the bowl and support. Thereupon, by merely rotating the turning portion 46, the parts will be securely connected together. Further, it will be evident that they may be released by a reverse rotation of this part, the bowl 1 then being laterally separable bodily with the member 38 on the ends 32' and enclosing the member 33 and slidable off the latter at will to permit removal of the same and the band 32, while the member 45 remains connected to the support 6.

Attention is further directed to the improved connections for the bottom end of the support 6. Here it will be noted that the lower end of this member is outwardly curved as at 50 and set in a correspondingly curved recess 51 preferably formed in a suitable projection 52 on the casing 8, both the end 50 and the recess 51 herein being correspondingly curved both longitudinally and transversely. It will also be noted that the bolt 26 used to connect the baffle 25 to the casing 8 extends through the end 50 of the support 6 and thus also acts as a connecting means therefor. It will also be observed that a dowel 53 disposed above this bolt 26 is disposed in a corresponding aperture 54 and acts effectually to prevent any relative rotation between the casing 8 and the member 6.

In the use of my improved construction, it will be evident that when the lamp 7 is lighted, with the parts disposed as shown in Figure 1, and water in the lower bowl 1 and ground coffee in the upper bowl 3, the heated water will act to infuse the coffee in a well known manner, common in vacuum type coffee makers. During this heating operation, it will further be noted that the flame, as a result of my improved construction, will be both so clean as to be practically invisible and very stable, while being effectually insulated by the air flow from the upper end of the casing 8 and by the baffle 25 from the support 6. At the end of the infusion period, the flame may obviously be snuffed in any suitable manner, as, for example, by placing a usual cover 7' thereover after lifting the coffee maker bodily by the handle 6; the brewed coffee then running back into the lower bowl 1 for dispensing after a normal infusion period, and the upper bowl 3 then also being removed, all in a usual manner. After the removal of this upper bowl, it will also be evident that the lower bowl 1, support 6 and casing 8 cooperate to form a very convenient coffee dispensing unit, the casing 8 being readily removable to any angle whatever from the lamp 7 without conflict between any parts of either, while the support 6 provides a convenient and always comfortably cool handle enabling the bowl 1 to be used in pouring. Further, it will be evident that if desired to keep hot any coffee remaining in the bowl 1, the flame may be ignited at any time or left burning as desired, the casing 8 thereafter being left over the lamp. Ordinarily, however, it is found that this is unnecessary, the usual practice in hotels, for example, being to carry away the lamp 7 and the upper bowl 3 when the latter is removed, leaving with the guest only the pouring unit comprising the casing 8, support 6, and bowl 1, it being found that the heat is retained sufficiently in the bowl 1 for a second or even a third cup of coffee.

Figure 10:
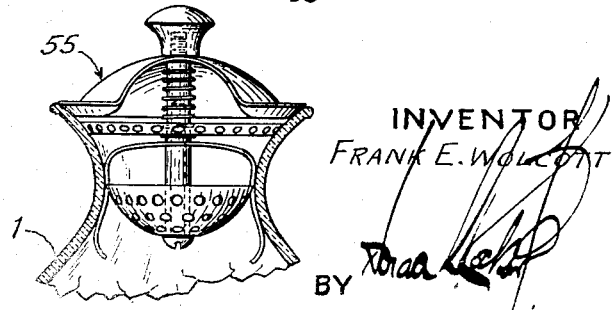
Figure 10 is a detail vertical sectional view showing the lower bowl equipped with a strainer in its neck, for use as a tea maker.

When desired to use the structure for tea making or dispensing, I remove the bowl 3 and place in the neck of the bowl 1 a suitable combined straining and pouring element such, for example, as that generally indicated at 55 in Figure 10. Obviously, with such an element 55 in place and tea in the bowl 1, the tea may be steeped as long as desired and then dispensed from the bowl 1 in the general manner previously described. After use as a coffee maker or for making and dispensing tea, it will, of course, be evident that the lower bowl 1 may be readily removed whenever desired, as, for example, for cleansing, by simply releasing its connection at the upper end of the support 6 and then releasing the connecting means and then withdrawing the bowl laterally from its position on the support 28, the neck grasping band also, of course, being removable if desired.

While I have in this application specifically described one embodiment which my invention may assume in practice, it will be understood that this form of the same is chosen for purposes of illustration, and that the invention may be modified and embodied in other forms without departing from its spirit or the scope of the appended claims.

What I claim as new and desire to secure by Letters Patent is:

1. A bowl support including bowl neck grasping means and having a dispensing handle and a support for the lower end of said handle comprising a heater enclosing casing beneath said neck grasping means and carrying said handle.

2. A bowl support including bowl neck grasping means and having a dispensing handle and a support for the lower end of said handle having beneath said bowl support a heater casing carrying said handle, said casing having an axial chamber therein having an axial opening in its top and heating means in said chamber exposed by said axial opening.

3. A bowl support including bowl neck grasping means and having a dispensing handle, a support for the lower end of said handle having beneath said neck grasping means a heater casing carrying said handle, and cooperating bowl supporting means carried on said casing.

4. A bowl support including bowl neck grasping means and having a dispensing handle, a support for the lower end of said handle having beneath said neck grasping means a heater casing carrying said handle, cooperating bowl supporting means carried on said casing, a bowl supported on said bowl supporting means and grasped by said neck grasping means, and means for removably connecting said neck grasping means to the upper end of said handle.

5. A bowl support including bowl neck grasping means and having a dispensing handle and a support for the lower end of said handle comprising an upwardly projecting flue forming member apertured to receive a spirit lamp therein.

6. A bowl support including bowl neck grasping means and having a dispensing handle, a support for said handle having beneath said bowl support an upwardly projecting flue forming member delivering beneath a bowl grasped by said means and apertured to receive a spirit lamp therein, and a spirit lamp flame baffle carried on said flue forming member and projecting above the top thereof adjacent the lower end of said handle.

7. A bowl support including bowl neck grasping means and having a dispensing handle, a support for said handle beneath said grasping means comprising an upwardly projecting flue forming member delivering beneath a bowl grasped by said means and apertured to receive a spirit lamp therein, and a cooperating bowl support carried on said flue forming member.

8. A bowl support including bowl neck grasping means and having a dispensing handle, a support for said handle beneath said grasping means comprising an upwardly projecting flue forming member delivering beneath a bowl grasped by said means and apertured to receive a spirit lamp therein, and a cooperating bowl support carried on said flue forming member, said cooperating support having a portion engaging the bottom of a bowl grasped by said grasping means.

9. A bowl support including bowl neck grasping means and having a dispensing handle, a support for said handle beneath said grasping means comprising an upwardly projecting flue forming member apertured to receive a spirit lamp therein, a cooperating bowl support carried on said flue forming member, said cooperating support having a portion engaging the bottom of a bowl supported on said handle, and means on the upper end of said handle for permitting lateral separation of a bowl and said grasping means from said handle and said cooperating support.

10. In a beverage heating device, a bowl support including bowl neck grasping means and having a dispensing handle, a support for the lower end of the latter, and a cooperating bowl support carried on said second mentioned support for supporting a bowl grasped by said grasping means and supported on said handle.

11. In a beverage heating device, a bowl support including bowl neck grasping means and having a dispensing handle, a support for the lower end of the latter having an axial opening in its top, and bowl heating means in said second mentioned support exposed by said opening, and a cooperating quick cooling bowl support carried by said second mentioned support and for supporting a bowl grasped by said means.

12. In a beverage heating device, a bowl support including bowl neck grasping means and having a dispensing handle, and a support for the latter including bowl heating means disposed beneath said bowl support and having an outer casing carrying the lower end of said handle, and baffle means carried by said casing and between said heating means and the lower end of said handle.

13. In a beverage heating device, a bowl support having a dispensing handle, a support for the lower end of said handle, a cooperating bowl support fixed on the top of said second mentioned support for supporting a bowl supported on said first mentioned bowl support, and means for permitting bodily lateral removal of such a bowl from said first mentioned bowl support while supported on said cooperating bowl support.

14. In a beverage heating device, a bowl support including bowl neck grasping means and having a supporting handle, flue forming means disposed beneath said bowl support and supporting the lower end of said handle and having an open bottom, and a spirit lamp disposed in said flue forming means and having its bottom seated in the opening in the bottom thereof on an independent support.

15. In a beverage heating device, a bowl support including bowl neck grasping means and having a supporting handle, flue forming means disposed beneath said bowl support and supporting the lower end of said handle and having an open bottom, and a spirit lamp disposed in said flue forming means and having its bottom seated in the opening in the bottom thereof on an independent support, said flue forming means and lamp having non-conflicting cooperating flue forming parts for enabling while grasping said handle a tilting separating movement of said flue forming means and lamp about any portion of the bottom periphery of said lamp.

16. In a beverage heating device, a bowl support including bowl neck grasping means and having a supporting handle, flue forming means disposed beneath said bowl support and supporting said handle, and a spirit lamp seated in said flue forming means, said flue forming means being laterally apertured at its bottom and having inwardly converging walls and internal ribbed means spacing said lamp therefrom.

17. In a beverage heating device, a bowl support including bowl neck grasping means and having a supporting handle, flue forming means disposed beneath said bowl support and supporting said handle, and a spirit lamp seated in said flue forming means, said flue forming means being laterally apertured at its bottom and axially apertured in its top and having converging inner walls providing a constricted portion adjacent the top of said lamp and an expanding portion above said constriction.

18. In a coffee maker, bowl neck grasping means having a depending supporting handle, a support for the lower end of said handle comprising a heater casing, heating means disposed within said casing, a vacuum type coffee maker comprising a lower bowl grasped by said neck grasping means and heated by said heater and a cooperating operatively connected upper bowl in said lower bowl, and means for effecting quick cooling of said lower bowl upon cessation of heating following a coffee making operation.

19. In a coffee maker, bowl neck grasping means having a depending supporting handle, a support for the lower end of said handle comprising a heater casing, heating means disposed within said casing, a vacuum type coffee maker comprising a lower bowl grasped by said neck grasping means and heated by said heater and a cooperating operatively connected upper bowl in said lower bowl, and cooperating bowl supporting means on said casing supporting the bottom of said lower bowl.

20. In a beverage heating device, a bowl support including bowl neck grasping means and having a yielding supporting handle, a support for the lower end of said handle, a lower bowl supported by said bowl support, a cooperating bowl receivable in said bowl, and means on said second mentioned support for preventing springing of said handle upon insertion of said cooperating bowl.

21. In a beverage heating device, a bowl support including bowl neck grasping means and having a yielding supporting handle, a support for the lower end of said handle, a lower bowl supported by said bowl support, a cooperating bowl receivable in said bowl, heating means disposed beneath said first mentioned bowl, and quick cooling means likewise carried by said second mentioned support for preventing springing of said handle upon insertion of said cooperating bowl.

22. In a beverage heating device, a bowl support including bowl neck grasping means and having a depending handle, a support for the lower end of said handle, a lower bowl supported by said bowl support, a cooperating bowl receivable in said bowl, a bowl support for said lower bowl carried by said second mentioned support, and means for permitting bodily lateral removal of said lower bowl and neck grasping means from said handle while supported on said last mentioned bowl support.

23. A heating stove for coffee or tea makers comprising a flue forming member having an axial lamp aperture therein and an axial opening in its top, a spirit lamp in said aperture having a flame producing portion extending into said opening, and means for effecting an air flow of large volume up inside the upper end of said flue forming member and feeding the lamp flame while maintaining a band of air insulation between the same and the upper end of said member.

24. A heating stove for coffee or tea makers comprising a flue forming member having an axial lamp aperture therein and an axial opening in its top, a spirit lamp in said aperture having a flame producing portion extending into said opening, and means for providing air flow through said flue comprising aperture means in the base of said flue forming member and cooperating flue forming ribs on the inner wall of said member.

25. A heating stove for coffee or tea makers comprising a flue forming member having an axial lamp aperture therein and an axial opening in its top, a spirit lamp in said aperture having a flame producing portion extending into said opening, and means for providing air flow through said flue comprising aperture means in the base of said flue forming member and cooperating flue forming ribs on the inner wall of said member, said member having a constricted portion above said ribs and below the top of said lamp and a flaring mouth above said constricted portion adjacent the top of said lamp.

26. In a coffee maker, bowl neck grasping means having a depending handle, a heater casing carrying the lower end of said handle, heating means disposed in said casing, and means between the lower end of said handle and said heating means for preventing undue heating of said handle by said heating means.

27. In a coffee maker, bowl neck grasping means engaging the neck of a bowl and having a depending handle, a heater casing carrying the lower end of said handle, heating means disposed in said casing, a cooperating bowl support on said casing engaging the bottom of a bowl supported on said first mentioned support, and releasable means for connecting said neck grasping means to the upper end of said handle.

FRANK E. WOLCOTT.